United States Patent [19]

Gradl et al.

[11] Patent Number: 4,704,670

[45] Date of Patent: Nov. 3, 1987

[54] POWER SUPPLY WITH REGULATED OUTPUT VOLTAGE

[75] Inventors: David A. Gradl, Naperville; James R. Krueger, Elk Grove Village, both of Ill.

[73] Assignee: American Telephone & Telegraph Company, AT&T Bell Laboratories, Murray Hill, N.J.

[21] Appl. No.: 948,128

[22] Filed: Dec. 31, 1986

[51] Int. Cl.$^4$ .................... H02M 3/335; H04M 19/00
[52] U.S. Cl. ...................................... 363/21; 323/275; 379/400; 379/413
[58] Field of Search .............. 323/274, 275, 284, 285, 323/299; 363/20, 21, 95, 97; 379/400, 413

[56] References Cited

U.S. PATENT DOCUMENTS

| | | | |
|---|---|---|---|
| 4,056,689 | 11/1977 | Freimanis | 379/413 |
| 4,056,691 | 11/1977 | Freimanis | 379/400 |
| 4,146,832 | 3/1979 | McConnell | 323/285 |
| 4,246,634 | 1/1981 | Purol | 363/49 |
| 4,326,245 | 4/1982 | Saleh | 323/275 |
| 4,402,039 | 8/1983 | Jirka | 363/21 |
| 4,499,532 | 2/1985 | Hudson et al. | 363/21 |
| 4,639,551 | 1/1987 | Kaire | 323/275 |

Primary Examiner—Patrick R. Salce
Assistant Examiner—Judson H. Jones
Attorney, Agent, or Firm—Peter Visserman

[57] ABSTRACT

A power supply circuit for use with telecommunication subscriber lines provides a substantially constant power output over one range of load impedances and a substantially constant voltage output over a range of load impedances greater than a critical impedance. The circuit employs a transformer which includes a sense winding for sensing output voltage across the load. For load impedances below the critical value, the current into the primary of the transformer is controlled by means of a current sensing device sensing the amount of primary current. However, for load impedances greater than the critical impedance the output of the sense winding controls and current to the primary is reduced to avoid the output voltage from rising substantially even in the event of an open circuit load condition. In one embodiment, a supervisory circuit provides a signal indicative of the on-hook and off-hook states of the subscriber line by sensing primary current flow. In an alternate embodiment, a supervisory circuit provides an indication of the on-hook and off-hook states of the subscriber line in response to a signal derived from the sense winding voltage.

9 Claims, 4 Drawing Figures

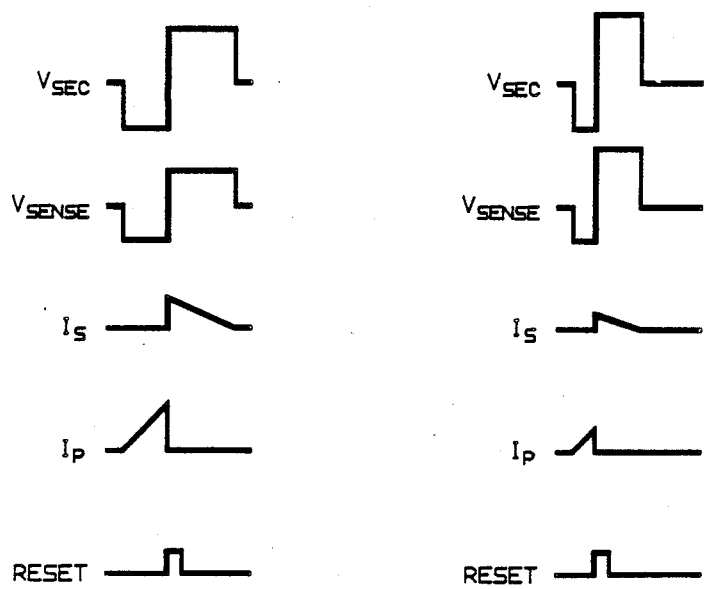
FIG. 2
FIG. 3
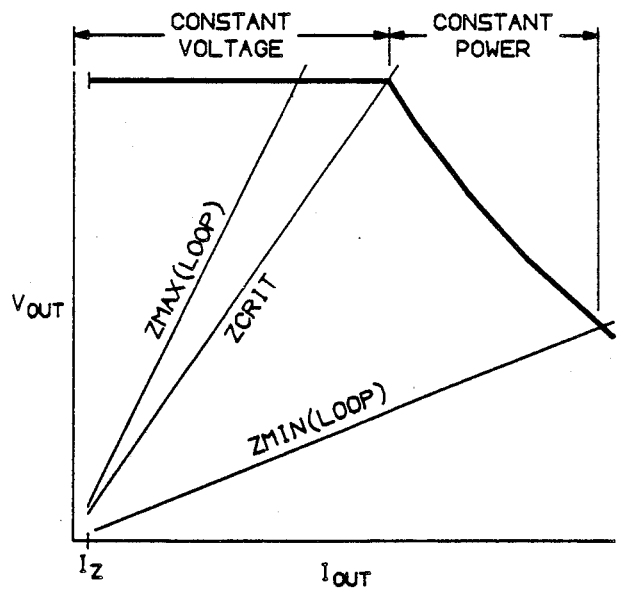
FIG. 4

POWER SUPPLY WITH REGULATED OUTPUT VOLTAGE

TECHNICAL FIELD

This invention relates to power supplies and more specifically to power supplies used in telecommunication systems having a transformer and control circuitry for providing pulsed input current to the transformer.

BACKGROUND OF THE INVENTION

In some applications it is desirable to limit the output voltage of power supplies when a high impedance, such as an open circuit load is presented to the output of the power supply. This is the case for power supplies which provide power to subscriber lines of a communication system. While it is desirable to provide a nearly constant power output to subscriber lines in order to accommodate lines of varying length and line impedance, it is also desirable to avoid significantly higher than normal output voltage levels. A number of different power supply designs employ a transformer with a switching circuit controlling input current to the primary of the transformer on a pulsed basis. One particular design uses a feedback winding coupled to the primary winding of the transformer to control the current flow in the primary. Such prior art power supplies, however, have the disadvantage that due to imperfection in the circuit elements the output voltage tends to rise significantly when the open circuit load condition is encountered. Furthermore, output voltages of such prior art power supplies tend to vary with variations in input voltage. Another problem in the design of power supplies for subscriber lines is the ability to detect accurately the on-hook and off-hook states of a connected subscriber set.

SUMMARY OF THE INVENTION

In accordance with this invention, a power supply circuit comprising a transformer having a primary and a secondary winding and circuitry for controlling current input to the primary winding includes a sense winding in the transformer connected to the control circuitry for sensing the magnitude of the transformer output voltage and for controlling the control circuitry to reduce the current input to the primary when the transformer output voltage exceeds a voltage level.

Advantageously, the power supply circuit, in accordance with this invention, provides a substantially constant power output over one range of output impedance values less than a predetermined critical value and a substantially constant voltage output over a range of output impedance values greater than the critical value.

In one embodiment of the invention, a transistor switch is connected in series with the primary coil for controlling the flow of input current to the coil and is controlled by means of a clocked circuit to periodically turn on the switch to allow current to build up in the primary winding. A current sensing device, which may be a standard resistor, in series with the transistor switch provides a voltage signal proportional to the current in the primary. In this embodiment, the sense winding is connected to a voltage conversion circuit which provides an output signal corresponding to a fixed reference voltage level when the voltage of the sense winding is below the reference value and provides an output signal at a reduced voltage level when the voltage of the sense winding exceeds the reference value. The output of the conversion circuit is used as a reference signal for a comparator circuit to which the output of the current sensing device is applied. The comparator provides an output signal which causes the transistor to assume the cutoff state when the voltage supplied by the current sensing device exceeds the reference signal. Thus, as the voltage level of the sense winding, which is indicative of the transformer output voltage, rises above the fixed reference value, the reference signal to the comparator is reduced and the primary current is cut off at a lower value. Advantageously, input current to the primary winding is substantially constant when the transformer output voltage is below a predetermined value, corresponding to a critical load impedance, and is reduced when the impedance presented to the secondary is increased beyond the critical value. In this manner, excessively high output voltages are prevented in case of a high impedance or open circuit load condition. Advantageously, the fixed reference voltage source is a circuit which is substantially independent of input voltage variations and the circuit output is substantially independent of variations in input voltage.

One specific embodiment of the invention includes a supervisory circuit providing an output signal indicative of the on-hook/off-hook state of any subscriber set connected to the power supply circuit. In an alternate embodiment, a supervisory circuit is generated from a signal derived from the sense winding output signal. Advantageously, these circuits generate supervisory signals without the need for additional transformer windings, and independent of extraneous signals which may be induced in the loop circuit.

BRIEF DESCRIPTION OF THE DRAWING

FIGS. 2 and 3 show waveforms of current and voltage in the circuit of FIG. 1 for different load impedances; and FIG. 4 is a plot of the power supply output voltage as a function of the output current.

DETAILED DESCRIPTION

Figure 1:
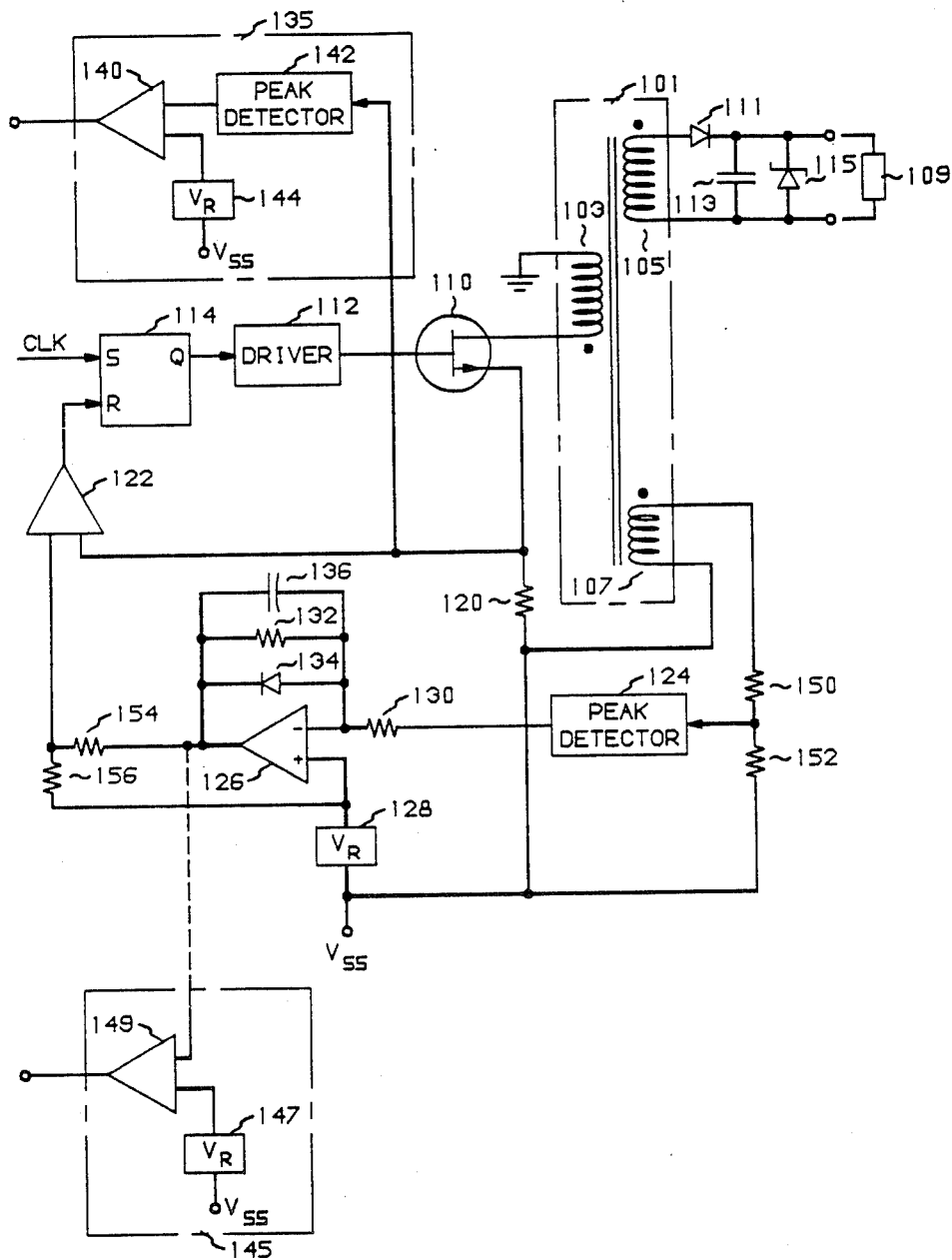
FIG. 1 is a circuit diagram of a power supply circuit designed in accordance with the principles of this invention.

FIG. 1 is an illustrative embodiment of the invention including a transformer 101, a primary winding 103, a secondary winding 105 and a sense winding 107. This particular circuit is designed for use in a telephone switching system in which the standard voltage source provides $-48$ volts dc. Thus, the current in the primary winding 103 flows from ground to the source, Vs, in accordance with the standard current flow convention. The direction of mutual inductance between the windings of the transformer is indicated by the standard dot convention. Input current to the primary winding 103 is controlled by means of a transistor switch 110 which may be a well-known field effect transistor which is turned on when gate voltage current is applied to the transistor allowing current to flow in the series path which includes the primary winding. The gate voltage is applied to the base of transistor 110 by means of a driver circuit 112 which may be a standard amplifier. A standard S/R flip-flop 114 is alternately set and reset, providing a high or low voltage signal to the driver 112. The driver is responsive to a high voltage input signal from the flip-flop to provide the gate voltage to the transistor sufficient to place the transistor in the conducting state. The flip-flop 114 is set periodically by a clock pulse and is reset in response to a signal from comparator circuit 122 when the primary current reaches a desired level.

The series circuit that includes the primary winding 103 and the transistor 110 further includes a resistor 120 which is used as a current sensor to measure the current flow in the series circuit by means of the voltage drop across the resistor. The resistor, which is connected between the transistor and a −48 volt power supply, may be a standard low value resistor of, for example, 10 ohms. The end of resistor 120 which is connected to the transistor is also connected to a comparator circuit 122, and when the resistor voltage reaches a reference level, the comparator applies a signal to the reset side of the flip-flop 114. This causes the flip-flop to assume the reset state in which the driver 112 is disabled causing the transistor 110 to be turned off thereby cutting off the input current to the primary winding 103. The set terminal of the flip-flop 114 is connected to a clock pulse which causes the flip-flop to be set periodically. This causes the driver 112 to be enabled and the transistor 110 to be turned on for the next cycle of primary current. The diode prevents current flow in the secondary when the primary current is flowing. When the primary current is cut off, secondary current begins to flow through diode 111 to capacitor 113 and load 109.

FIGS. 2 and 3 show primary and secondary current waveforms as well as the corresponding secondary and sense winding voltage waveforms in relation to the set and reset pulses applied to the flip-flop 114. FIG. 2 shows these waveforms under a load condition in which the loop impedance is less than a critical impedance Z-crit, and FIG. 3 shows the same waveforms when the loop impedance is greater than the critical impedance. At the leading edge of the clock pulse shown in FIG. 2, the flip-flop 114 is set resulting in a buildup of the primary winding current Ip. When the current reaches a level at which the voltage across the resistor 120 exceeds the level of a reference signal applied to comparator 122, the reset pulse is applied to flip-flop 114. Consequently, primary current is cut off and secondary current Is begins to flow. Because of polarity of the windings, the secondary voltage Vs and the voltage across the sense winding V-sense will be negative at the dot end when primary current is flowing and will be positive at the dot end when the secondary current is flowing. The secondary winding, 105 is connected to a load 109 via a network consisting of a diode 111 and a capacitor 113, which in the present embodiment is a 5 microfarad capacitor.

The sense winding 107 has one end thereof connected to the source Vss and another end connected to a peak detector circuit 124 through resistor 150. The resistor 150 and resistor 152 connected between the input of the peak detector 124 and the source Vss are used to attenuate the signal. The values of resistors 150 and 152 have been chosen as 43 K ohms and 4.5K ohms, respectively. The peak detector circuit is a well-known circuit which provides an output voltage equal to the peak value of the input voltage. The output of the peak detector 124 is connected through 1.21K ohm resistor 130 to an input terminal of well-known operational amplifier 126. A 100K ohm resistor 132 is connected from the output of the amplifier to the inverting input in parallel with a diode 134 and a 0.02 microfarad capacitor 136 which provides feedback stability. The output of the amplifier is connected to a reference input of comparator circuit 122 through a 4.64K ohm resistor 154. Resistor 154 together with a 1 K ohm resistor 156 connected from the reference input terminal to reference source 128, serve to attenuate the amplifier output signal. The operational amplifier has a reference input terminal connected to a reference voltage source 128 of approximately 3 volts. The voltage source may be a well-known band gap reference circuit, providing a reference voltage substantially independent of variations in the source Vss.

When the voltage output from the peak detector 124 is lower than that of the reference voltage source 128, the operational amplifier 126 provides an output voltage equal to the reference voltage. Thus, as long as the detected sense winding voltage is below the reference level, the reference input terminal of the comparator 122 will be at constant voltage level. Consequently, the reset pulse will occur at the same level of primary current in each cycle and the energy supplied the primary winding will be essentially the same in successive cycles. This results in a constant power output at the secondary winding.

In the event of an increase in load impedance, however, the load current will decrease and the voltage across the load terminals will increase. This high voltage will be reflected in the sense winding 107. Consequently, the voltage level of the output signal of the peak detector circuit 124 will increase and will eventually exceed the level of the reference voltage 128. When the level of the output signal of the peak detector circuit 124 exceeds the reference voltage 128, the output voltage of the operational amplifier 126 will be reduced correspondingly. This reduces the level of the input signal to comparator 122 and accordingly, causes the comparator 122 to provide a reset signal to the flip-flop 114 for lower values of the voltage measured at the resistor 120. That is, a reset signal to flip-flop 114 will be generated for lower values of primary input current. FIG. 3 shows the waveforms of the primary and secondary currents and of the voltage across the secondary windings and the sense winding. As can be seen from FIG. 3, the higher voltage in the sense winding results in a shorter period of current flow in the primary due to an earlier occurrence in the cycle of the reset pulse to the flip-flop 114. This in turn results in reduced power to the secondary winding and prevents an excessive voltage build-up across the high impedance load.

FIG. 4 depicts in graphical form the output voltage of the power supply circuit across the load 109 as a function of the output current. The figure shows an approximately constant voltage for values of current less than the current for a critical load impedance Z-crit. In an experimental circuit, the output voltage was approximately 60 volts. The output current is prevented from becoming zero by means of a zener diode 115 connected across the load. Zener diode begins to conduct at 70 volts as the load current approaches zero. For output current greater than the current corresponding to a critical load impedance Z-crit the output power is essentially constant and, hence, the voltage decreases as the current increases. This is valid over a range of output current between a value corresponding to the critical impedance and a minimum impedance of approximately 200 ohms, which is the minimum impedance expected to be encountered in a telephone subscriber line. For load current values between the zener current and the current corresponding to a critical load impedance, the output voltage of the circuit is substantially constant as a result of the modulation of the pulse width of the primary winding input current in response to a higher load voltaged sensed by the sense winding 107. The critical load impedance may be computed by the following formula:

$$Z\text{-crit} = \frac{2 \times (R_1 + R_2)^2 \times R_s^2}{N^2 \times R_2^2 \times F \times L_p} \qquad (1)$$

where
  $R_1$ = resistor 150 = 43 K ohms
  $R_2$ = resistor 152 = 4.5 K ohms
  $R_s$ = resistor 120 = 10 ohms
  N = turns ratio of primary to sense winding = 0.5
  F = clock frequency = 256 KHz
  $L_p$ = primary inductance = 200 μH The illustrative circuit of FIG. 1 has been designed for use with a telephone line of a communication switching system and is provided with a supervision circuit 135 the output of which may be sampled from time to time by a system controller to determine the off-hook/on-hook status of the subscriber line. The supervisory circuit consists of a comparator 140 which has one terminal connected through a peak detector to the current sensing resistor 120 and another terminal connected to a reference source 144. This may be a well-known band gap reference circuit of approximately 1.5 volts, whioh is substantially independent of variations in voltage of source Vss. The voltage across the current sensing resistor 120 will vary with the pulsed primary winding input current and the peak detector 142 is designed to provide an ou put signal corresponding to the peak value of resistor voltage to provide a signal to the comparator 140. In the case of an on-hook condition, the line impedance will be high and is expected to be greater than the critical impedance shown in FIG. 4. Consequently, there will be a comparatively lower peak voltage at the resistor 120 and at the corresponding input connection of comparator 140. In the event of an off-hook condition, the impedance in the loop will be low, and accordingly, a comparatively higher peak voltage can be expected at the sensing resistor 120. The value of the reference voltage source 144 will be chosen to be greater than the voltage signal expected in the case of the on-hook condition and less than the voltage signal expected in the case of the off-hook condition. Accordingly, in the off-hook condition a different voltage signal will be supplied at the output of comparator 140 in the case of an on-hook condition than in the case of an off-hook condition. In this manner, a supervisory output indicative of the state of the line is provided by the comparator 140.

An alternative embodiment of an off-hook/on-hook detector 145 is shown in FIG. 1 connected by dotted line to the output of operational amplifier 126. In the event of an off-hook condition, the load impedance will be relatively low and, hence, the amplifier will provide a relatively high level output voltage, at the level of the reference source 128. In the on-hook condition the loop impedance will be high, greater than Z-max indicated in FIG. 4, which is the maximum expected on-hook loop impedance. The constant voltage line in FIG. 4 has a slight slope from approximately 60 volts at the knee to approximately 65 volts as the line approaches the abscissa and this voltage difference is sufficient to distinguish between Z-max and on-hook at the output of amplifier 126. The amplifier output levels are compared against a reference source 147, by comparator 149, to provide the appropriate supervisory output signal.

It will be apparent to those skilled in the art that various changes and modifications may be made to the illustrative embodiment without departing from the spirit and scope of the invention described herein. It is therefore intended that such changes and modifications be covered by the following claims.

What is claimed is:

1. A power supply circuit for use in a communication switching system comprising:
   a transformer circuit having a primary winding and a secondary winding and a sense winding for sensing magnitude of transformer output voltage;
   switch means connected to said primary winding for providing input current to said primary winding;
   current sensing means connected in series with said switch means and responsive to current flow in said switch means to generate a first voltage output signal;
   voltage signal generating means connected to said sense winding and responsive to a sense winding voltage signal developed by said sense winding to generate a second output voltage signal having a first voltage level when said sense winding voltage signal is less than a reference voltage and having a second voltage level less than said first level when said sense winding voltage signal is greater than said reference voltage; and
   means responsive to said first and said second voltage signals to control said switch means to reduce input current to said primary winding when said first output voltage signal exceeds said second output voltage signal;
   whereby input current to said primary winding is reduced when the transformer output voltage is higher than a specified value to maintain transformer output voltage below a predetermined level under varying load conditions.

2. The power supply circuit in accordance with claim 1 wherein said means responsive to said first and second voltage signals comprises comparator means responsive to said first and second voltage signals to generate a comparator output signal and means connected to said comparator means and said switch means and responsive to a clock signal to control said switch to provide current to said primary winding and responsive to said comparator output signal to cut off current to said primary winding.

3. A power supply circuit comprising:
   transformer means comprising a primary winding, a secondary winding connectable to an electrical load and a sense winding for sensing transformer output voltage;
   circuit means for controlling current flow in said primary winding;
   current sensing means connected in series with said primary winding to sense current flow in said primary winding;
   means for connecting said circuit means to said sense winding and said current sensing means;
   said circuit means responsive to signals from said current sensing means and said sense winding for reducing current flow in said primary winding in accordance with a signal from said current sensing means corresponding to a predetermined limit of current flow when transformer output voltage is below a predetermined level and in accordance with a signal from said sense winding when transformer output voltage is not below said predetermined level;

whereby the power supply circuit provides constant power output when the output voltage is below a predetermined level and a constant voltage output when the output voltage reaches the predetermined level.

4. A power supply in accordance with claim 3 wherein said means for connecting comprises voltage level detection means connected between sense winding and said circuit means.

5. A power supply circuit in accordance with claim 3 wherein said means for connecting comprises means connected between said circuit means and said sense winding responsive to an output voltage of said sense winding and a reference voltage to generate an output signal to said circuit means of a first value when said voltage of said sense winding is less than said reference voltage and to another lower value when said sense voltage is greater than said reference voltage.

6. A power supply circuit in accordance with claim 5 further comprising voltage supply means for generating said reference voltage substantially independent of input voltage variations, whereby the current flow in the primary winding is controlled substantially independent of power supply input voltage variations.

7. A power supply circuit in accordance with claim 3 wherein said circuit means comprises means for comparing said signals from said current sensing means and said sense winding and for generating an output signal when the magnitude of the current sensing means signal exceeds the magnitude of the sense winding signal, and means responsive to said comparator means output signal to cut off current flow to said primary winding.

8. The power supply circuit in accordance with claim 3 wherein said secondary winding is connectable to an electrical load comprising a telephone subscriber loop including a telephone set and said power supply circuit comprises supervisory detection circuit means for generating an output signal indicative of the on-hook and off-hook states of a connected subscriber telephone set, said supervisory circuit means comprising means connected to said current sensing means and a reference potential for generating a first output signal when the magnitude of a signal from said current sensing means exceeds a supervisory reference signal and for generating a second output signal when said signal from said current sensing means is less than said supervisory reference signal, whereby a low impedance off-hook condition is detected in the electrical load when current flow is relatively high in the primary winding and the on-hook high impedance condition is detected when current is relatively lower in the primary winding.

9. The power supply circuit in accordance with claim 3 wherein said secondary winding is connectable to an electrical load comprising a telephone subscriber loop including a telephone set and said power supply circuit comprises supervisory detection circuit means for generating an output signal indicative of the on-hook and off-hook states of a connected subscriber set, said supervisory circuit means comprising comparator means having an input terminal connected to said means connected between said circuit means and said sense winding and connected to a reference signal source and responsive for generating a first supervisory output signal when transformer output voltage exceeds a predetermined level and for generating a second supervisory signal when transformer output voltage does not exceed said predetermined level, whereby a high impedance on-hook condition is detected when the transformer output voltage exceeds the predetermined level and the low impedance off-hook condition is detected when the transformer output voltage does not exceed the predetermined level.

* * * * *